United States Patent
Hunacek

(10) Patent No.: US 11,363,351 B2
(45) Date of Patent: *Jun. 14, 2022

(54) EMBEDDING WATERMARKING DATA

(71) Applicant: NAGRAVISION S.A., Cheseaux-sur-Lausanne (CH)

(72) Inventor: Didier Hunacek, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,791

(22) Filed: Jun. 26, 2020

(65) Prior Publication Data
US 2020/0366970 A1    Nov. 19, 2020

Related U.S. Application Data

(63) Continuation of application No. 16/074,243, filed as application No. PCT/EP2017/052077 on Jan. 31, 2017, now Pat. No. 10,721,544.

(30) Foreign Application Priority Data

Feb. 1, 2016    (GB) ..................................... 1601793

(51) Int. Cl.
*H04N 21/8358* (2011.01)
*H04N 21/2343* (2011.01)
*H04N 21/2362* (2011.01)
*H04N 21/845* (2011.01)

(52) U.S. Cl.
CPC ..... *H04N 21/8358* (2013.01); *H04N 21/2362* (2013.01); *H04N 21/234345* (2013.01); *H04N 21/8456* (2013.01)

(58) Field of Classification Search
None
See application file for complete search history.

(56) References Cited

U.S. PATENT DOCUMENTS 6,865,747 B1    3/2005 Mercier
8,144,923 B2    3/2012 Zhao
(Continued)

FOREIGN PATENT DOCUMENTS

EP    2490446 A1    8/2012

OTHER PUBLICATIONS

Office Action dated Oct. 6, 2020 in corresponding European Patent Application No. 17 702 856.0, 5 pages.
(Continued)

*Primary Examiner* — Hung Q Dang
(74) *Attorney, Agent, or Firm* — Oblon, McClelland, Maier & Neustadt, L.L.P.

(57) ABSTRACT

The disclosure provides a method of making watermarking data embedded in an Elementary Stream ES accessible to a receiver. The ES comprises video and/or audio data and is to be transmitted as a Packetized Elementary Stream PES in a Transport Stream TS such that the receiver can use the watermarking data to watermark the video and/or audio data in the ES without reconstructing the ES from the TS. The watermarking data identifies one or more watermarking locations in the video and/or audio data in the ES to be modified by the receiver in accordance with the watermarking data. The method comprises determining respective one or more watermarking TS locations in the TS corresponding to the one or more watermarking locations. The method further comprises embedding, in the ES, the watermarking data including watermarking location information identifying the one or more watermarking TS locations, or modifying watermarking data embedded in the ES by adding the (Continued)

watermarking location information. The method may further comprise subsequent to embedding or modifying the watermarking data, packetizing the ES into one or more PES packets, each packet comprising a packet header, and adding watermarking data location information identifying a location in the TS corresponding to a location of the watermarking data in the ES to the packet header of a PES packet (or in a TS header or elsewhere in the TS). The disclosure also provides a corresponding method of watermarking and related systems, devices, computer programs and Transport Streams.

12 Claims, 6 Drawing Sheets

(56) References Cited

U.S. PATENT DOCUMENTS

| | | |
|---|---|---|
| 8,358,703 B2 | 1/2013 | Zou |
| 9,288,057 B2 | 3/2016 | Jarnikov |
| 2002/0064225 A1 | 5/2002 | Furuta |
| 2002/0122369 A1 | 9/2002 | Sako |
| 2004/0117645 A1 | 6/2004 | Okuda |
| 2006/0072750 A1 | 4/2006 | Steenhof |
| 2006/0215984 A1 | 9/2006 | Nesvadba |
| 2006/0239503 A1 | 10/2006 | Petrovic |
| 2009/0049302 A1 | 2/2009 | Zhao |
| 2009/0136087 A1 | 5/2009 | Oren |
| 2010/0100742 A1 | 4/2010 | Courington |
| 2012/0159174 A1 | 6/2012 | Gregotski |
| 2013/0301872 A1 | 11/2013 | Flaharty |
| 2014/0050458 A1 | 2/2014 | Mochinaga |
| 2016/0036885 A1 | 2/2016 | Takashima |
| 2016/0261928 A1 | 9/2016 | Sarda |
| 2018/0184160 A1 | 6/2018 | Cain |
| 2019/0335213 A1 | 10/2019 | Bieber |

OTHER PUBLICATIONS

International Search Report and Written Opinion for related PCT Application No. PCT/EP2017/052077, dated Apr. 20, 2017 (12 pages).

EMBEDDING WATERMARKING DATA

CROSS REFERENCE TO RELATED APPLICATIONS

This application is a continuation of U.S. application Ser. No. 16/074,243, filed on Jul. 31, 2018, and is based upon and claims the benefit of priority to International Application No. PCT/EP2017/052077 filed Jan. 31, 2017, and from the prior British Patent Application No. 1601793.1 filed on Feb. 1, 2016. The entire contents of each of these documents are incorporated herein by reference.

TECHNICAL FIELD

The present disclosure relates to the embedding of watermarking data in a Transport Stream, in particular a MPEG-2 compliant Transport Stream.

BACKGROUND

The MPEG-2 standard provides for the transmission and multiplexing of video and audio data in a Transport Stream TS (see ISO/IEC standard 13818-1 or ITU-T Rec. H.222.0, both incorporated by reference herein). An Elementary Stream ES encodes video data in a Video Coding Layer VCL, as well as other data in a non-video coding layer. The ES is packetized in Packetized Elementary Stream PES packets by grouping the NAL units of each video frame in a PES packet to form a PES stream, which in turn is split into TS packets forming the TS. Typically, the TS packets are much smaller than the PES packets.

The elementary stream is organised in Network Access Layer NAL units containing video coding data, as well as NAL units containing non-video coding data. An example of the latter is Supplemental Enhancement Information SEI NAL units. SEI NAL units can carry private data in addition to that prescribed by the applicable standard and may carry watermarking data in this way. The organisation of the ES, and in particular the video coding NAL units depend on the codec used to encode the video data, an example of which is the H.264 codec (see ISO/IEC 14496-10 and ITU-T Recommendation H.264, incorporated herein by reference). The present disclosure is not limited to any particular codec but, rather, is applicable independently of how the video data is encoded.

Watermarking data is data inserted in an ES, typically in a SEI NAL unit, by a watermarking provider and is used by a consumer device receiving and decoding a TS containing the ES to insert a watermark characteristic of the consumer device (for example, based on a device ID) and possibly a timestamp indicative of the time of decoding in the decoded ES. The watermarking data typically comprises a list of watermarking locations at which video (or audio) data is to be modified in dependence upon device ID and/or timestamp data. For example, the list comprises triplets of a location identifier (such as a byte offset relative to the SEI NAL unit comprising the watermarking data, or a video slice), a (byte or slice) value to write at the location if a corresponding bit of the ID and/or timestamp data is 0, and a value to write at the location if a corresponding bit of the ID and/or timestamp data is 1. The watermarking modifications are arranged so that they are not perceptible but can be detected with a corresponding tool to identify the device and/or time of decoding. Since the watermarking data is embedded in the ES and defines the locations to modify inside the ES, the consumer device can only watermark the ES once the TS has been decoded to form the ES. Forming the ES from the TS is a computationally intense operation.

MPEG-2 TS video streams are often sent in scrambled form to allow Conditional Access Systems CAS to restrict consumption of the streams only to authorised subscribers, for example in digital broadcasting in accordance with the DVB standard. The consumer device descrambles the scrambled TS to produce a clear text TS, allowing a MPEG decoder to form the ES from the TS (parse the TS and PES) and to decode the video signal from the ES. In many CAS the decoding is clone in a dedicated hardware component, typically a Secure Element SE, often provided on a smartcard, cartridge or dongle for example, a USB dongle, or a dedicated CAS chip or chipset.

SUMMARY

A first aspect of the disclosure provides a method of making watermarking data embedded in an Elementary Stream ES accessible to a receiver. The ES comprises video and/or audio data and is to be transmitted as a Packetized Elementary Stream PES in a Transport Stream TS such that the receiver can use the watermarking data to watermark the video and/or audio data in the ES without reconstructing the ES from the TS. The watermarking data identifies one or more watermarking locations in the video and/or audio data in the ES to be modified by the receiver in accordance with the watermarking data.

The method comprises determining respective one or more watermarking TS locations in the TS corresponding to the one or more watermarking locations. The method further comprises embedding, in the ES, the watermarking data including watermarking location information identifying the one or more watermarking TS locations, or modifying watermarking data embedded in the ES by adding the watermarking location information.

Advantageously, by identifying watermarking locations to be watermarked by a receiving device in a TS frame of reference, the receiving device can carry out the watermarking operations on the TS without having to assemble the ES first. Since assembly of the ES from the TS requires significant computational resources, this means that the processing and/or memory requirement for watermarking can be significantly reduced. Advantageously, this can enable watermarking to be done in secure hardware, for example in a smartcard, cartridge, dongle, dedicated chip or chipset of a CAS. Thus, security may be increased by enabling watermarking to be done with secure hardware, which may otherwise not have sufficient computational resource, thereby reducing the risk of preventing watermarking by tampering.

The ES, PES and TS may be compliant with the MPEG-2 standard for Transport Streams as defined in ISO/IEC standard 13818-1 or ITU-T Rec. H.222.0 or any revisions or versions thereof, i.e. the TS may be decoded by a device implementing or being compliant with the relevant MPEG-2 standard. For example, various standards include the MPEG-2 standard for TS, notably the DVB standard, in particular in relation to Conditional Access Systems (CAS). More generally, the ES comprises video and/or audio data encoded in a suitable way, as well as other data, comprising watermarking data. In some embodiments, data relating to a given frame is packaged in a corresponding PES packet. In some embodiments, each PES packets is packetized into one or more TS packets, typically a plurality of TS packets, the TS packet size typically being much smaller than the PES packet size.

The ES may comprise any compatible codec and the present disclosure is not limited to any particular codec. Some embodiments use the H.264 codec. In some embodiments, the ES is defined in terms of Network Access Layer units, including video coding NAL units and non-video coding NAL units. Non-video coding NAL units may include Supplemental Enhancement Information SEI NAL units, for example in accordance with the particular standard defining the codec used in the ES and, in some embodiments, the watermarking data is provided in a SEI NAL unit comprising the watermarking data.

In some embodiments, the step of adding the watermarking location information may comprise overwriting watermarking location information already embedded in the ES. Alternatively, adding the watermarking location information may comprise inserting the watermarking location information in addition to watermarking location information already embedded in the ES.

In some embodiments, the watermarking location information identifying a TS location may comprise an offset relative to a last TS packet comprising the water marking data, for example in terms of bytes or in terms of a TS packet identifier and bytes within the identified TS packet. In some embodiments, determining respective one or more watermarking TS locations in the TS corresponding to the one or more watermarking locations comprises computing the respective watermarking TS locations based on the number of TS packets of the PES packets containing the watermarking data and watermarking ES locations.

In some embodiments, the method further comprises, subsequent to embedding or modifying the watermarking data, packetizing the ES into one or more PES packets, each packet comprising a packet header, and adding watermarking data location information identifying a location in the TS corresponding to a location of the watermarking data in the ES at TS or PES level, for example adding watermarking data location information to the packet header of a PES packet.

By providing information on the location of the watermarking data accessible at the level of the TS, advantageously, the method can be made more flexible. Without this information available at the TS and/or PES level, the receiver would have to decode/parse the TS and then the PES to obtain the ES in order to find the watermarking data, or the watermarking data would have to be provided in a fixed (or one of a number of known) location in the IS. Providing information about the location of the watermarking data in a way that is accessible at the TS level allows the watermarking data to be placed anywhere in the ES in line with conventional watermarking schemes, thus making unauthorised detection and manipulation more difficult. In particular, by placing the watermarking data information location in the header of a PES, which is scrambled by CAS, the location of the watermarking data in the ES is protected from unauthorised access. By contrast, information in TS headers is not scrambled in CAS.

This further (and other subsequent) steps may be carried out by the same party, e.g. a watermarking provider, as the steps of determining and adding watermarking TS locations to the ES. However, these steps may instead be carried out by a different entity receiving and ES with TS watermarking locations from, e.g., a watermarking provider, and preparing the received ES for transmission and aspects of the disclosure extend to such scenarios.

Accordingly, a second aspect of the disclosure provides a method of making watermarking data embedded in an Elementary Stream ES accessible to a receiver. The ES comprises video and/or audio data and is to be transmitted as a Packetized Elementary Stream PES in a Transport Stream TS such that the receiver can use the watermarking data to watermark the video and/or audio data in the ES without reconstructing the ES from the TS. The watermarking data identifies one or more watermarking TS locations in the TS corresponding to respective one or more watermarking ES locations in the ES to be modified by the receiver in accordance with the watermarking data. The method comprises adding watermarking data location information identifying a location in the TS corresponding to a location of the watermarking data in the ES to the TS or PES. The method may comprise packetizing the ES into one or more PES packets, each packet comprising a packet header, and adding watermarking data location information identifying a location in the TS corresponding to a location of the watermarking data in the ES to the packet header of a PES packet.

In some embodiments, the watermarking data location information identifying a location in the TS corresponding to a location of the watermarking data in the ES is added to the packet header of a PES packet containing the watermarking data. In some embodiments, the watermarking data location information comprises an offset within the PES packet comprising the water marking data, or PES packet identifier and offset if not in the same PES packet as the header identifying the watermarking data.

In some embodiments, the method comprises packetizing the PES packets into TS packets of the TS and may also comprise transmitting the TS to the receiver. As for the packetizing into PES packets, these steps may be carried out by the same or different entities.

A third aspect of the disclosure provides a method of watermarking video data in an Elementary Stream ES. The method comprises receiving a Transport Stream TS carrying Packetized Elementary Stream PES packets of the ES and accessing data in the TS comprising watermarking data location information identifying the location of watermarking data in the TS (in a frame of reference of the TS or PES). For example, a data may be located in a PES packet header comprising watermarking data location information identifying the location of watermarking data in the TS. The method further comprises detecting the watermarking data location information and accessing the watermarking data at the location in the TS identified by the watermarking data location information, wherein the watermarking data comprises watermarking location information identifying one or more watermarking TS locations in the TS corresponding to respective one or more watermarking locations in the ES to be modified. Subsequently, video data to be modified is identified using the watermarking location information and the identified video data at the one or more watermarking TS locations is modified in accordance with the watermarking data.

In some embodiments, the received TS comprises a plurality of multiplexed ES and the method comprises demultiplexing the received TS to extract a PES or TS containing a single ES. In some embodiments, the method may comprise decoding/parsing the TS to assemble the ES and may further comprise decoding the ES to generate video and/or audio signals. It will be appreciated that the method may be implemented in a device carrying out all these steps, or the device may stop at the watermarking modifications, with subsequent steps being implemented by another device, so that some embodiments only implement the method up to the watermarking modifications.

In some embodiments, the TS is received in scrambled form, and the method comprises descrambling the scrambled TS prior to assembling the PES packet. The descrambling or even the entire method up to and including the watermarking modifications may be implemented in dedicated conditional access hardware. In some embodiments, the remaining steps are implemented in less secure hardware outside the conditional access hardware. The dedicated conditional access hardware may consist of one of a smart card, a dongle or a dedicated conditional access chip or chipset.

A fourth aspect of the disclosure provides a content reproduction device comprising a receiver for receiving a Transport Stream TS encoding an Elementary Stream ES, a memory for storing all or a portion of the TS as it is received, and a processor for processing the TS. The processor is configured to:

access data in the TS, for example in a PES packet header, the data comprising watermarking data location information identifying the location of watermarking data in the TS;

detect the watermarking data location information;

access the watermarking data at the location in the TS identified by the watermarking data location information, wherein the watermarking data comprises watermarking location information identifying one or more watermarking TS locations in the TS corresponding to respective one or more watermarking locations in the ES to be modified;

identify video data to be modified using the watermarking location information; and modify the identified video data at the one or more watermarking TS locations in accordance with the watermarking data.

In some embodiments, the processor is configured to descramble the TS prior to assembling the PES packet. Whether providing a descrambling functionality or not, the processor may be implemented by dedicated conditional access hardware. The dedicated conditional access hardware implementing the processor may consist of or comprise one of a smart card, a dangle or a dedicated conditional access chip or chipset.

Aspects of the disclosure further provide a computer program product or one or more tangible computer readable media comprising coded instructions, which, when executed by a computing platform, implement a method as described above, as well as a systems comprising a computing platform configured to implement one or more of the methods as described above or systems comprising means for implementing one or more of the methods described above, preferably in a secure environment.

BRIEF DESCRIPTION OF THE DRAWINGS

Specific embodiments illustrating aspects of the disclosure are now described by way of example with reference to the accompanying drawings, in which.

For ease of reference, the following abbreviations will be used in the description that follows:
ES—Elementary Stream
PES—Packetized Elementary Stream
TS—Transport Stream
NAL—Network Abstraction Layer
SEI—Supplemental Enhancement Information

SPECIFIC DESCRIPTION

Figure 1:
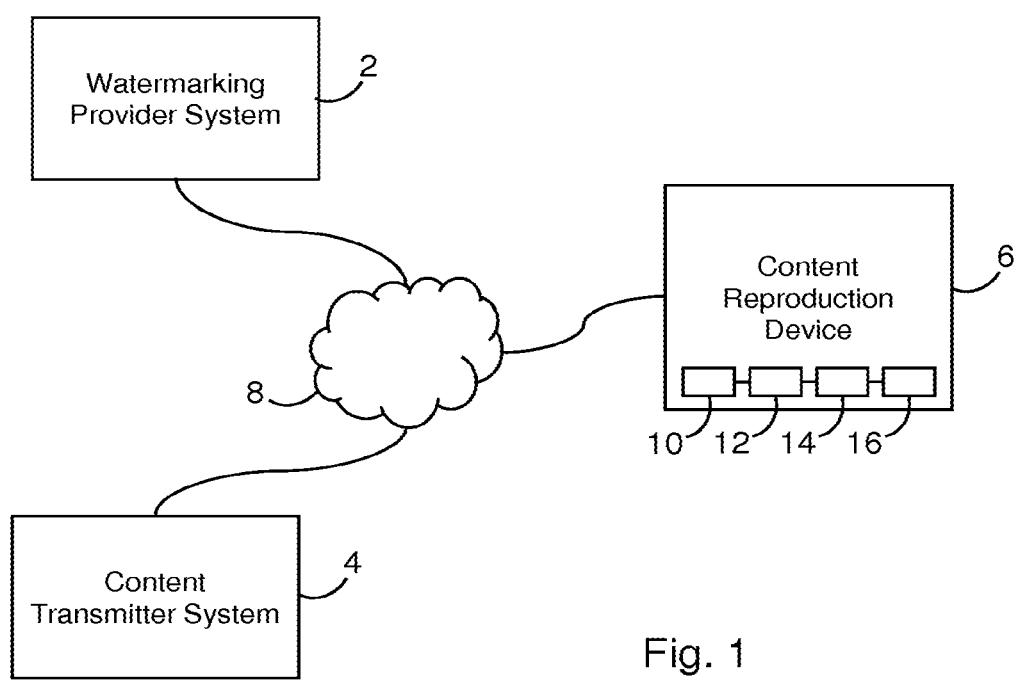
FIG. 1 illustrates a network of a watermarking provider system, a content transmitter system and a content reproduction device.

With reference to FIG. 1, a watermarking provider system 2, content transmitter system 4 and content reproduction device 6 each comprise a respective computing platform, comprising one or more processors and memory devices for processing video and auxiliary data, as described in detail below. The watermarking provider system 2, content transmitter system 4 and content reproduction device 6 are in communication with each other over a communications network 8. For example, the watermarking provider system 2 may communicate with the content transmitter system 4 over the Internet or a dedicated data connection and the content transmitter system 4 may communicate with the content reproduction device 6 over a broadcast connection, for example by cable, satellite or terrestrial broadcast. Likewise, the content transmitter system 4 may serve content to content reproduction device 6 over the Internet. It will be understood that the functions of the watermarking provider and content transmitter systems 2, 4 may be combined in a single system, for example in content transmitter system 4.

The content reproduction device 6 comprises a communications interface 10 for receiving data from the content transmitter system 4. In some embodiments, the content reproduction device 6 comprises a secure CAS module 12 for descrambling content received in scrambled form. The output of the CAS module 12 (where present) is connected to a video decoder 14. In some embodiments, the video decoder is configured to receive one or more ES from the CAS module 12, and to decode the one or more ES to produce a video and/or audio signal. In other embodiments, the video decoder is configured to receive a TS and recover one or more ES from the TS. In some embodiments, the video decoder 14 receives the TS and parses the TS/PES in accordance with the MPEG-2 TS standard. The video decoder 14, as referred to here, may thus combine the function of a TS/PES parser and ES codec decoder, or these functions may be implemented in separate components. The video and/or audio signal is provided to an output module 16, for example an HDMI output. In other embodiments, the content reproduction device comprises a display for presenting the content integrated with the content reproduction device. In some embodiments, the CAS module 12 is a secure module implemented in hardware, for example, a smart card, hardware, cartridge, dongle, dedicated CAS chip or chipset.

Methods of embedding water marking data, implemented by a watermarking provider system 2 and/or content transmitter system 4, on the one hand, and methods of using the embedded watermarking data implemented by the content reproduction device 6, on the other hand, are now be described with reference to FIGS. 2 and 3, respectively.

Figure 2:
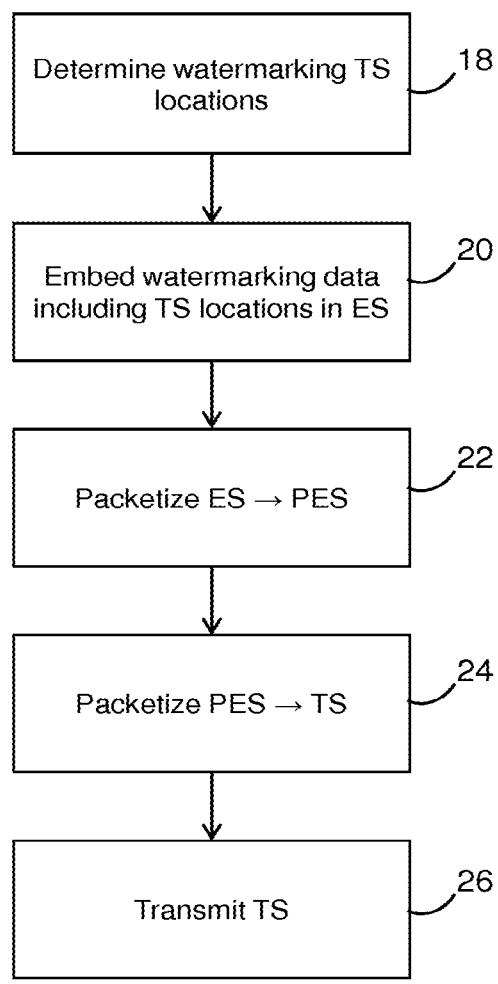
FIG. 2 illustrates a method of embedding watermarking data and transmitting an ES with embedded watermarking data.
Figure 3:
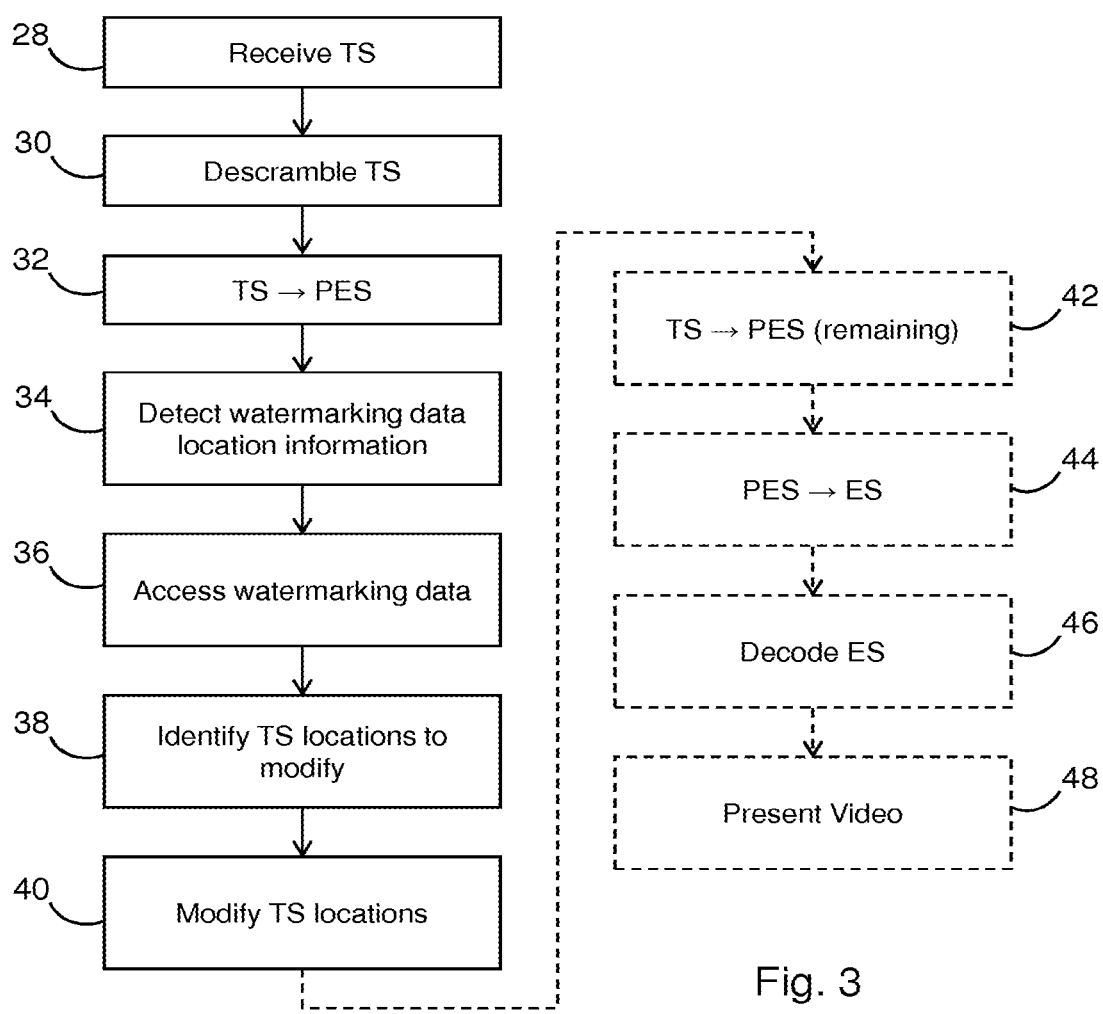
FIG. 3 illustrates a method of watermarking.
Figure 4:
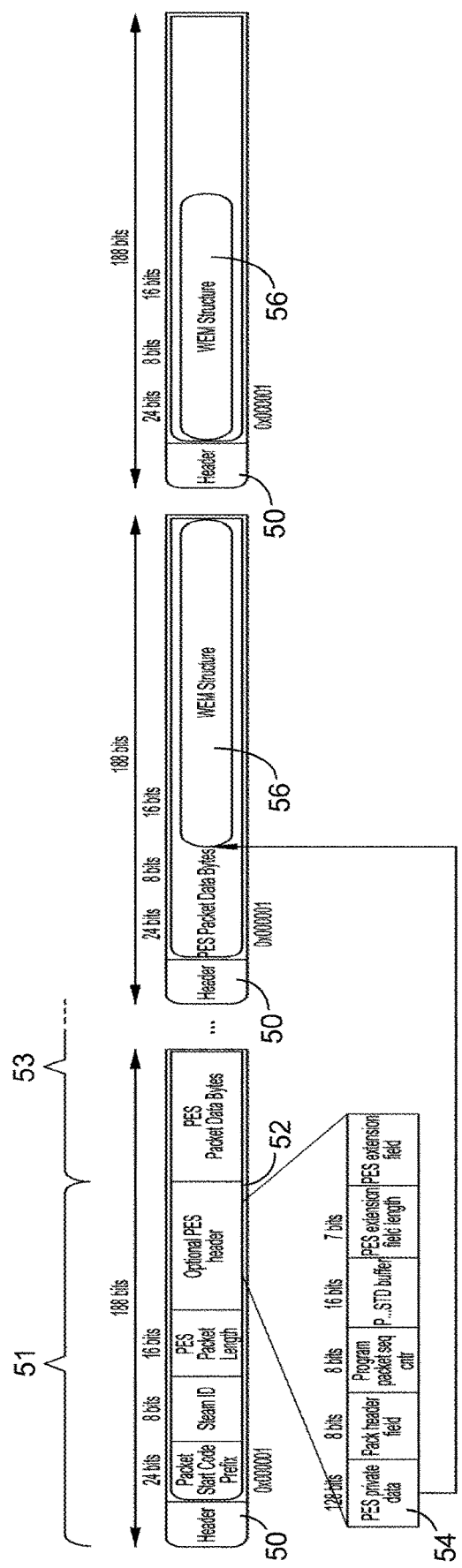
FIG. 4 illustrates a TS, including watermarking data and PES private data pointing to the watermarking data.

With reference to FIG. 2, at a first step 18, an ES, comprising video-coding NALs is examined to determine a location in the ES were to insert watermarking data that identifies watermarking locations in the ES were a device should carry out watermarking modifications, as well as to determine the watermarking locations in the ES. Based on knowledge of how the ES will be packetized into PES packets and, ultimately, a TS, in accordance with the MPEG-2 TS standard, watermarking TS locations in the frame of reference of the TS are determined. At step 20, information identifying the watermarking locations in the TS frame of reference is embedded in the ES as part of the watermarking data. For example, step 18 and 20 may be done by a watermarking provider, using the watermarking provider system 2 and the resulting TS may be transmitted to a content transmitter system 4 for further processing and transmission. However, it is equally envisaged that the watermarking provider may provide a content transmitter, for example a broadcaster, with an ES with watermarking data in a frame of reference of the ES embedded and that the broadcaster, using the content transmitter system 4, determines and embeds the location information in the TS frame of reference. In either case, the watermarking data is, in some embodiments, embedded in the ES in a SEI NAL unit.

At step 22, the ES is packetized into a plurality of PES packets. As part of this process, watermarking data location information pointing to the watermarking data in a TS frame of reference, for example as described below, is added to the header of a PES packet, for example a PES packet containing the portion of the ES with the watermarking data. Then, PES packets are packetized into smaller packets to form a MPEG-2 compliant TS at step 24. Steps 22 and 24 may be implemented by the content transmitter system 4 or by the watermarking provider system 2. In the latter case, the TS resulting from step 24 is transmitted to the content transmitter system 4, which transmits the TS at step 26, for example broadcasting, multicasting, providing on demand or otherwise transmitting the TS over one or more channels by cable, satellite, over the air or over the Internet. It will be appreciated that steps 18 to 26 can be split between the watermarking provider system 2 and the content transmitter system 4 in any convenient way and that the watermarking provider system 2 and the content transmitter system 4 may indeed be part of the same integrated system or under control of the same entity. Alternatively, each system may be controlled by a separate entity. Each system may be implemented in any number of sub-systems, which may be co-located or remote from each other as may be convenient under the circumstances.

Turning now to the content reproduction device 6, at step 28, the content reproduction device 6 receives the transport stream from the content transmitter system 4. In embodiments where the TS is received in scrambled form, it is descrambled at step 30. If the TS is multiplexed, it is demultiplexed to extract the TS of interest and the extracted scrambled ES is then processed at step 30. At step 32, the PES packets in the TS are accessed with or without assembling the PES packets. For example, the TS packets may simply be scanned for PES header data or PES packets may be fully or partially assembled and scanned for PES header data. At step 34 watermarking data location information is located in a PES header. As explained above, the watermarking data location information is provided in the PES header in the frame of reference of the TS. At step 36, the watermarking data is accessed and is used to identify the TS locations to modify in order to produce a watermark in accordance with the watermarking data at step 38. At step 40 TS locations to modify are modified in accordance with the watermarking data, by modifying these locations in a way that is characteristic of the device identity (for example, as a function of bits of a device identifier) and possibly the time of decoding (for example as a function of bits of a time-stamp). Many watermarking schemes operating on, for example, bytes in the ES or on video slices are known in the art and one, high-level, example is discussed below.

In some embodiments, the content reproduction device 6 is configured to watermark the TS as described above, and to produce the result of step 40 as an output, leaving a separate device to decode the TS to form an ES, and to process the ES to produce a video display. In other embodiments, the content reproduction device 6 may also comprise the infrastructure to implement a method of content, decoding and/or presentation. In such embodiments, at step 42, the content reproduction device 6 decodes the TS to produce a stream of PES packets to the extent that the PES packets have not already been formed in the previous steps. An ES is assembled from the PES packets at step 44 and decoded at step 46. The output of step 46 may be provided to an output module of the content reproduction device 6, for example, in embodiments in which the content reproduction device 6 is a set-top box. In other embodiments, the decoded ES may be presented on the display device integrated with the content reproduction device 6 at step 48, for example, in embodiments with the content reproduction device 6 is a smart TV.

In some embodiments, steps 30 to 40 are implemented in the CAS module 12 and steps 42-48 are implemented by modules 14 and 16, for example using module 14 for steps 42 to 46 and module 16 for steps 48.

Figure 5:
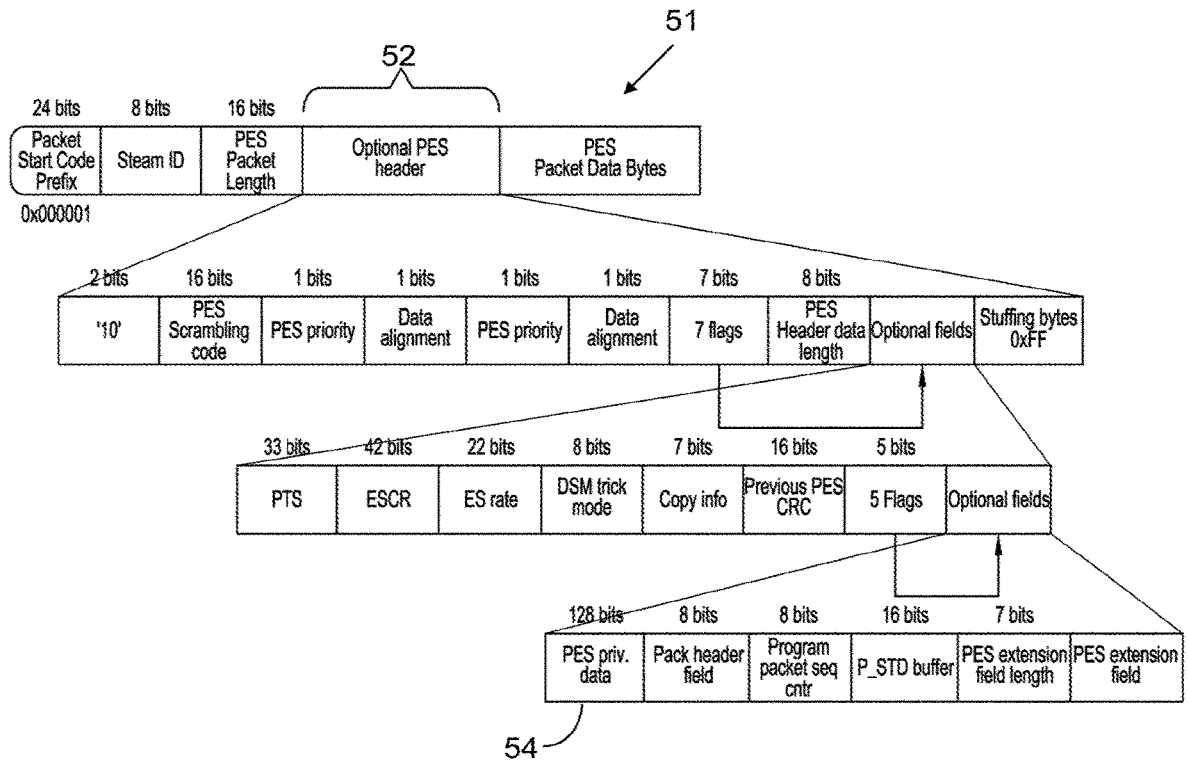
FIG. 5 illustrates how PES private data is embedded in the PES packet header.
Figure 6:
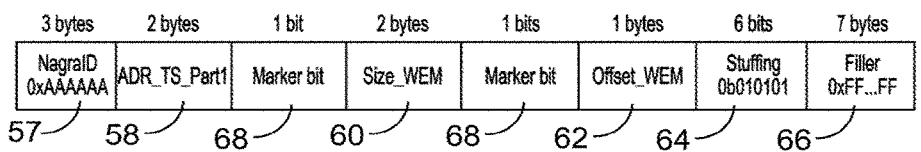
FIG. 6 illustrates units in the PES private data, facilitating, locating watermarking data in the TS.

With reference to FIGS. 4 to 7, a MPEG-2 compliant TS embodying the principles of the present disclosure and resulting from the process described above with reference to FIG. 2 is now described. The TS comprises TS packets 50 carrying a plurality of PES packets. Each PES packet comprises a PES packet header, 51, and PES packet data bytes 53. The MPEG-2 standard allows for optional PES header data 52, which in accordance with disclosed embodiments comprises PES private data 54 including data pointing to a location of watermarking data 56 in the TS. As illustrated in FIG. 5, the optional PES header comprises a number of data fields including optional fields indicated by corresponding flags, in particular including 128 bits reserved for PES private data 54. The PES private data field is used to provide a pointer to the location of the watermarking data 56 as follows:

- an ID code 57 indicating that the PES private data is used for watermarking data;
- an address 58 of the TS packet, where the watermarking data starts;
- a size indication 60 indicating the size of the data structure containing the watermarking data;
- an offset 62 indicating where in the TS packet with the address 58 the data structure containing the watermarking data begins (that is the first byte of the data structure);
- stuffing 64 to fill the PES private structure, optionally to further identify watermark private data;
- filler 66 to fill the 128 bits of the PES private data field; and
- marker bits 68 inserted between the address 58 and the size indication 60 and between the size indication 60 and the offset 62 in order to increase the flexibility with which these values can be chosen and avoid start code emulation.

Figure 7:
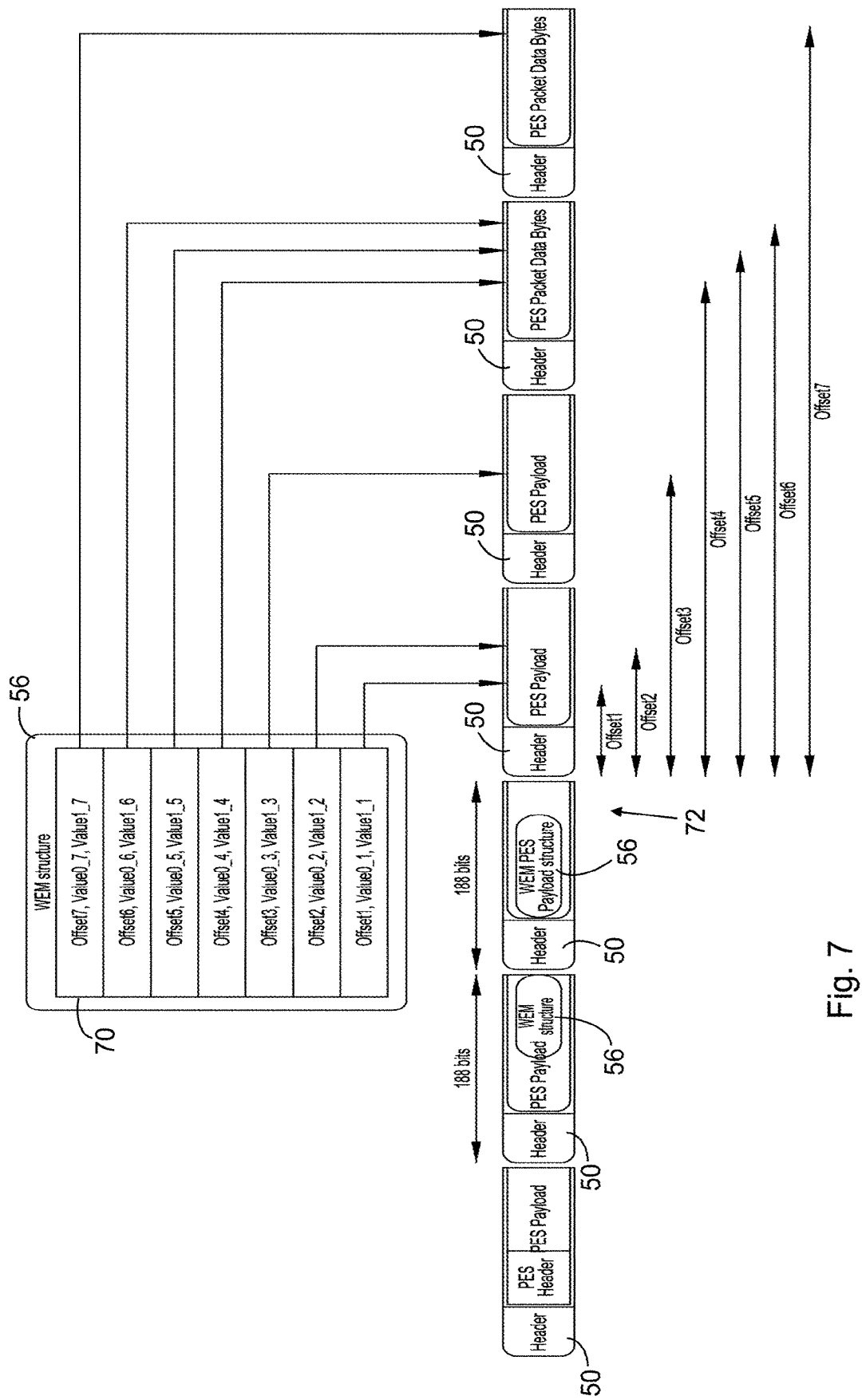
FIG. 7 illustrates watermarking data referencing TS locations for modification.

With reference to FIG. 7, the water marking data structure 56 comprises, in some embodiments, a collection of triplets 70, each comprising an offset value, a value to write to a location in the TS if a corresponding bit of a device identifier identifying the decoding device (e.g. content reproduction device 6) is 0, and a value to write to the location in the TS if a corresponding bit of the device identifier is 1. FIG. 7 illustrates the structure 56, with only seven triplets, but it will be appreciated that, in practice, a much larger number of triplets will be present. The particular bit of the identifier for each offset may be identified by the position of the offset in the list or the list may be augmented to contain quadruplets, each having a further value indicating the bit to be used for a decision between the modification values of each set. The modification values may be individual bytes to be written to the TS or respective collections of bytes, for example, corresponding to a slice in the video stream.

In various embodiments, the offset may be defined as a number of bytes relative to the end of the TS packet 72 in which the watermarking data structure 56 ends, for example, including the bytes of the TS packet headers. Alternatively, the offset could be specified in terms of only payload bytes. In either case, the relevant TS packet and position within the TS packet pointed to by the offset can be found, based on knowledge of the TS packet size (188 bytes) and structure (header size). Alternatively, the offset can be specified in terms of a TS packet address, together with an offset inside the relevant TS packet, or in any other suitable fashion. The offset can alternatively be defined in terms of PES packet addresses and offsets within a PES packet.

It will be understood that the watermarking data structure 56 may be defined in the ES (which is then packetized to form the PES and TS) in any suitable way. In some embodiments, the watermarking data structure 56, is defined in a SEI NAL unit in the same way as conventional watermarking data structures, save for the different definition of the modification locations, of course.

While the above description has been made in terms of a TS containing a single ES, the present disclosure is equally applicable to TS that multiplex several ES, as will be readily apparent to the person skilled in the art. The required modifications will be readily carried out by a person skilled in the art in order to process multiplexed TS, for example adding a demultiplexing step at some stage prior to applying the watermarking modifications, typically prior to a descrambler if present. Accordingly, aspects of the present disclosure equally extend to multiplexed IS as to TS encoding only a single ES.

The following embodiments are also disclosed:

1. A method of making watermarking data embedded in an Elementary Stream ES accessible to a receiver,
    wherein the ES comprises video and/or audio data;
    wherein the ES is to be transmitted as a Packetized Elementary Stream PES in a Transport Stream TS such that the receiver can use the watermarking data to watermark the video and/or audio data in the ES without reconstructing the ES from the TS; and
    wherein the watermarking data identifies one or more watermarking locations in the video and/or audio data in the ES to be modified by the receiver in accordance with the watermarking data,
    the method comprising:
    determining respective one or more watermarking TS locations in the TS corresponding to the one or more watermarking locations; and
    embedding, in the ES, the watermarking data including watermarking location information identifying the one or more watermarking TS locations or modifying watermarking data embedded in the ES by adding the watermarking location information.

2. A method according to item 1 comprising:
    subsequent to embedding or modifying the watermarking data, packetizing the ES into one or more PES packets, each packet comprising a packet header, and adding watermarking data location information identifying a location in the TS corresponding to a location of the watermarking data in the ES to a TS or PES packet header, preferably to the packet header of a PES packet.

3. A method of making watermarking data embedded in an Elementary Stream ES accessible to a receiver,
    wherein the ES comprises video and/or audio data;
    wherein the ES is to be transmitted as a Packetized Elementary Stream PES in a Transport Stream TS such that the receiver can use the watermarking data to watermark the video and/or audio data in the ES without reconstructing the ES from the TS; and wherein the watermarking data identifies one or more watermarking TS locations in the TS corresponding to respective one or more watermarking ES locations in the ES to be modified by the receiver in accordance with the watermarking data,
    the method comprising:
    packetizing the ES into one or more PES packets, each packet comprising a packet header, and adding location information identifying a location in the TS corresponding to a location of the watermarking data in the ES to the packet header of a PES packet.

4. A method according to item 2 or 3, the PES packet containing the watermarking data.

5. A method according to any one of items 2 to 4, comprising packetizing the PES packets into TS packets of the TS.

6. A method as claimed in item 5 comprising transmitting the TS to the receiver.

7. A method of watermarking video data in an Elementary Stream ES, the method comprising:
    receiving a Transport Stream TS carrying Packetized Elementary Stream PES packets of the ES;
    accessing data in the TS identifying the location of watermarking data in the TS;
    detecting the watermarking data location information in the header;
    accessing the watermarking data at the location in the TS identified by the watermarking data location information, wherein the watermarking data comprises watermarking location information identifying one or more watermarking TS locations in the TS corresponding to respective one or more watermarking locations in the ES to be modified;
    identifying video data to be modified using the watermarking location information; and
    modifying the identified video data at the one or more watermarking TS locations in accordance with the watermarking data.

8. A method according to item 7, wherein accessing data in the TS identifying the location of watermarking data in the TS comprises accessing data in a PES packet, the PES packet having a packet header comprising watermarking data location information identifying the location of watermarking data in the TS, preferably wherein the TS is received in scrambled form and the method comprises descrambling the scrambled TS prior to accessing data in the PES packet.

9. A method according to item 8, implemented in dedicated conditional access hardware.

10. A method according to item 9, wherein the dedicated conditional access hardware consists of one of a smart card, a dongle or a dedicated conditional access chip or chipset.

11. A content reproduction device comprising
a receiver for receiving a Transport Stream TS encoding an Elementary Stream ES;
a memory for storing all or a portion of the TS as it is received;
a processor for processing the TS, the processor being configured to:
access data in the TS, the data identifying the location of watermarking data in the TS;
detect the watermarking data location information in the header;
access the watermarking data at the location in the TS identified by the watermarking data location information, wherein the watermarking data comprises watermarking location information identifying one or more watermarking TS locations in the TS corresponding to respective one or more watermarking locations in the ES to be modified;
identify video data to be modified using the watermarking location information; and
modify the identified video data at the one or more watermarking TS locations in accordance with the watermarking data.

12. A device according to item 11, wherein accessing data in the TS identifying the location of watermarking data in the TS comprises accessing data in a PES packet, the PES packet having a packet header comprising watermarking data location information identifying the location of watermarking data in the TS, preferably wherein the processor is configured to descramble the TS prior to accessing data in the PES packet 13. A device according to item 12, the processor being implemented by dedicated conditional access hardware.

14. A device according to item 13, wherein the dedicated conditional access hardware implementing the processor consists of one of a smart card, a dongle or a dedicated conditional access chip or chipset.

15. A computer program product comprising coded instructions, which, when executed by a computing platform, implement a method according to any one of items 1 to 10.

16. One or more tangible computer readable media comprising coded instructions, which, when executed by a computing platform, implement a method according to any one of items 1 to 10.

17. A system comprising a computing platform configured to implement a method according to any one of items 1 to 10.

18. A system comprising means for implementing a method according to any one of items 1 to 10.

19. A Transport Stream comprising a data structure, the data structure comprising pairs of location and watermarking data, wherein the location data references locations in the TS to be modified by watermarking in a frame of reference of the TS and the watermarking data indicates the modification to be made at each location.

20. A Transport Stream according to item 19, wherein the watermarking data indicates the modification to be made at each location as a function of at least data identifying a device used to decode the TS.

21. A Transport Stream according to item 19 or 20, the transport stream comprising data indicating the location of the watermarking data in the frame of reference.

22. A Transport Stream according to item 21, the data indicating the location of the watermarking data being located in a FES header.

Having read the above description of specific embodiments and the preceding summary of aspects of the present disclosure, the skilled person will readily be aware that many modifications, juxtapositions, alterations and combinations of the features described above are possible and are covered by the scope defined by the claims that follow.

The invention claimed is:

1. A method of making watermarking data embedded in a single stream accessible to a receiver,
wherein the single stream comprises video and/or audio data;
wherein the single stream is to be transmitted as a packetized single stream in a streams package such that the receiver can use the watermarking data to watermark the video and/or audio data in the single stream without reconstructing the single stream from the streams package; and
wherein the watermarking data identifies one or more watermarking locations in the video and/or audio data in the single stream to be modified by the receiver in accordance with the watermarking data,
the method comprising:
determining respective one or more watermarking streams package locations in the streams package corresponding to the one or more watermarking locations; and
embedding, in the single stream, the watermarking data including watermarking location information identifying the one or more watermarking streams package locations or modifying watermarking data embedded in the single stream by adding the watermarking location information,
wherein the watermarking data includes at least one identifier to indicate a location that is used for watermarking data and an address of a streams package packet that includes a start of the watermarking data, all watermarking data having a same predetermined length.

2. The method according to claim 1 further comprising:
subsequent to embedding or modifying the watermarking data, packetizing the single stream into one or more packetized single stream packets, each packet comprising a packet header, and adding watermarking data location information identifying a location in the streams package corresponding to the location that is used for the watermarking data in the single stream the packet header of a packetized single stream packet.

3. The method according to claim 2, wherein the packetized single stream packet includes the watermarking data.

4. A method of watermarking video data in a single stream, the method comprising:
receiving a streams package carrying packetized single stream packets of the single stream;
accessing data in the streams package identifying a location of watermarking data in the streams package;
detecting, in the data in the streams package, watermarking data location information in a header of at least one of the packetized single stream packets;
accessing the watermarking data at the location in the streams package identified by the watermarking data location information, wherein the watermarking data comprises watermarking location information identifying one or more watermarking streams package locations in the streams package corresponding to respective one or more watermarking locations in the single stream to be modified;

identifying video data to be modified using the watermarking location information; and modifying the identified video data at the one or more watermarking streams package locations in accordance with the watermarking data, wherein the watermarking data includes at least one identifier to indicate a location that is used for watermarking data and an address of a streams package packet that includes a start of the watermarking data, all watermarking data having a same predetermined length.

5. The method according to claim 4, wherein the header of the at least one packetized single stream packet includes the watermarking data location information identifying the location that is used for the watermarking data in the streams package, the streams package is received in scrambled form, and the method comprises descrambling the scrambled streams package prior to accessing data in the packetized single stream packet.

6. A content reproduction device comprising
a memory; and
a processor configured to store, in the memory, a streams package that encodes a single stream as the streams package is received and to process the streams package, the processor being configured to:

access data in the streams package, the data identifying a location of watermarking data in the streams package;

detect, in the data in the streams package, watermarking data location information in a header of at least one packetized single stream packet included in the streams package;

access the watermarking data at the location in the streams package identified by the watermarking data location information, wherein the watermarking data comprises watermarking location information identifying one or more watermarking streams package locations in the streams package corresponding to respective one or more watermarking locations in the single stream to be modified;

identify video data to be modified using the watermarking location information; and modify the identified video data at the one or more watermarking streams package locations in accordance with the watermarking data, wherein the watermarking data includes at least one identifier to indicate a location that is used for watermarking data and an address of a streams package packet that includes a start of the watermarking data, all watermarking data to have a same predetermined length.

7. The device according to claim 6, wherein accessing data in the streams package identifying the location of watermarking data in the streams package comprises accessing the watermarking data location in the at least one packetized single stream packet, the header of the at least one packetized single stream packet comprising watermarking data location information identifying the location that is used for the watermarking data in the streams package, and the processor is configured to descramble the streams package prior to accessing the packetized single stream packet.

8. The device according to claim 7, wherein the processor is implemented by dedicated conditional access hardware.

9. A non-transitory computer-readable medium encoded with computer-readable instructions that, when executed by a computer, cause the computer to perform a method comprising:

generating a streams package comprising a data structure, the data structure comprising pairs of location and watermarking data, a location data referencing locations in the streams package to be modified by watermarking in a frame of reference of the streams package and the watermarking data indicates the modification to be made at each location; and transmitting the streams package, wherein the watermarking data includes at least one identifier to indicate a location that is used for watermarking data and an address of a streams package packet that includes a start of the watermarking data, all watermarking data to have a same predetermined length.

10. The non-transitory computer-readable medium according to claim 9, wherein the watermarking data indicates the modification to be made at each location as a function of at least data identifying a device used to decode the streams package.

11. The non-transitory computer-readable medium according to claim 9, wherein the streams package comprises data indicating the location that is used for the watermarking data in the frame of reference.

12. The non-transitory computer-readable medium according to claim 11, wherein the data indicating the location of the watermarking data is located in a packetized single stream header.

* * * * *